April 28, 1964 A. B. SEGUR 3,130,445
METHOD FOR REMOVING MEAT FROM POULTRY
Filed Dec. 29, 1960 4 Sheets-Sheet 4
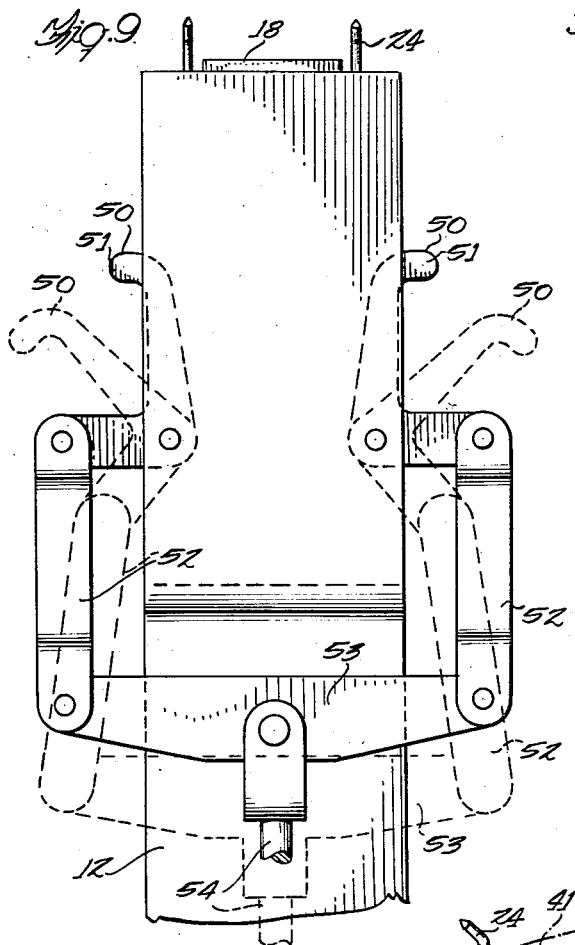
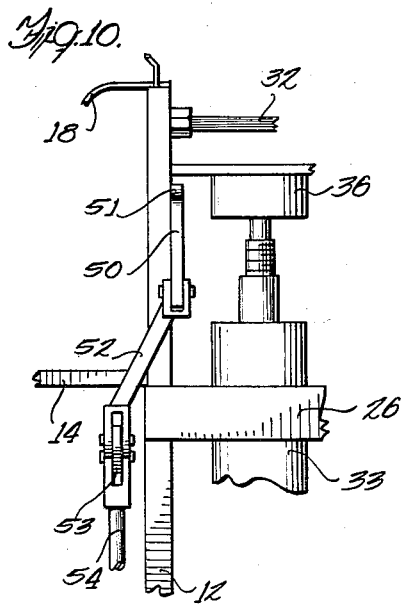
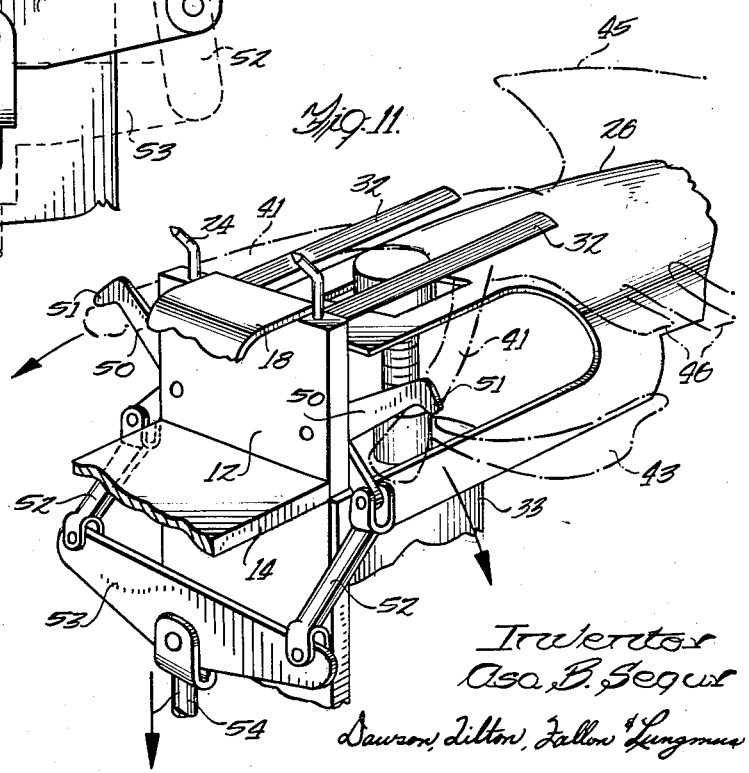

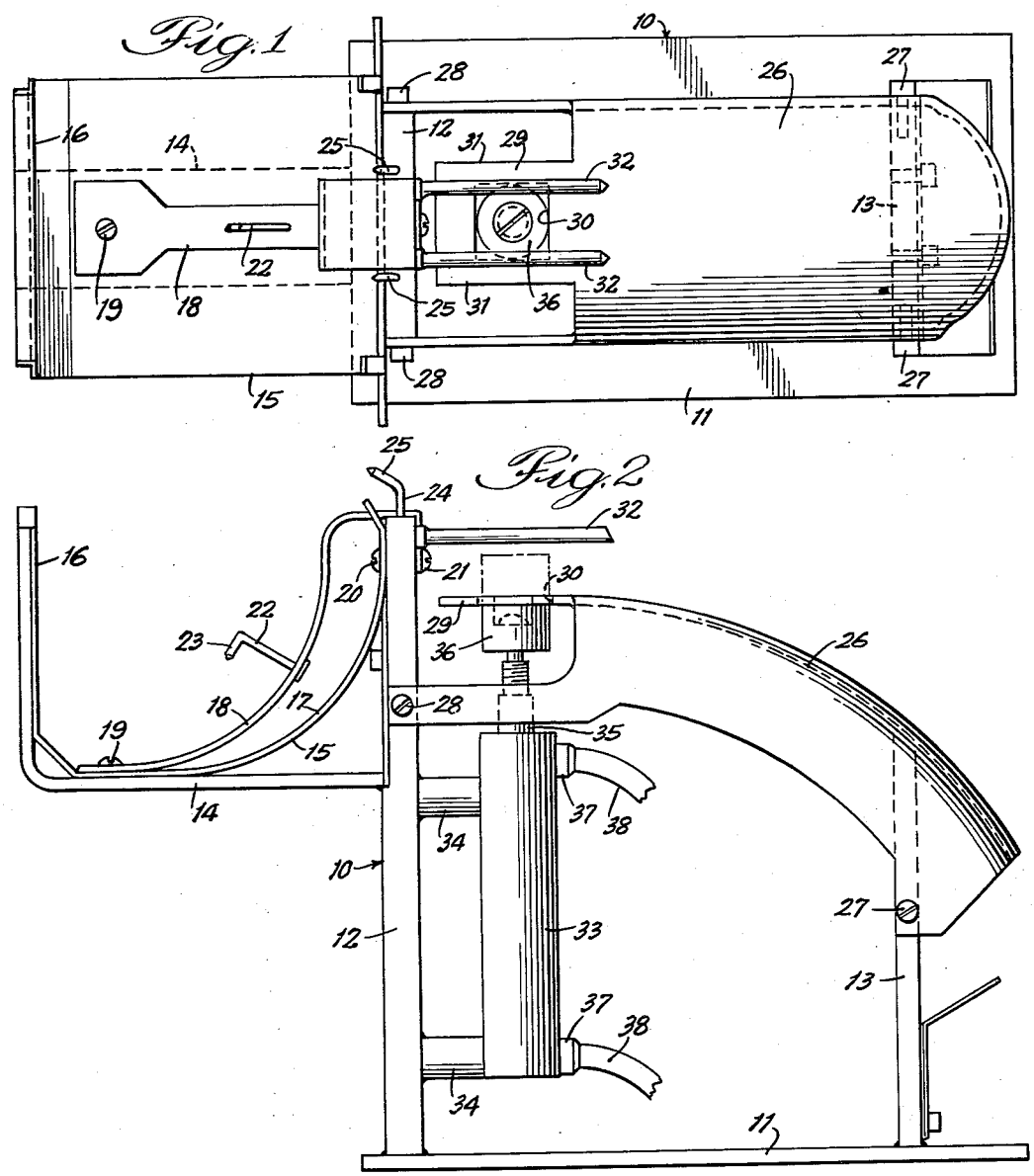

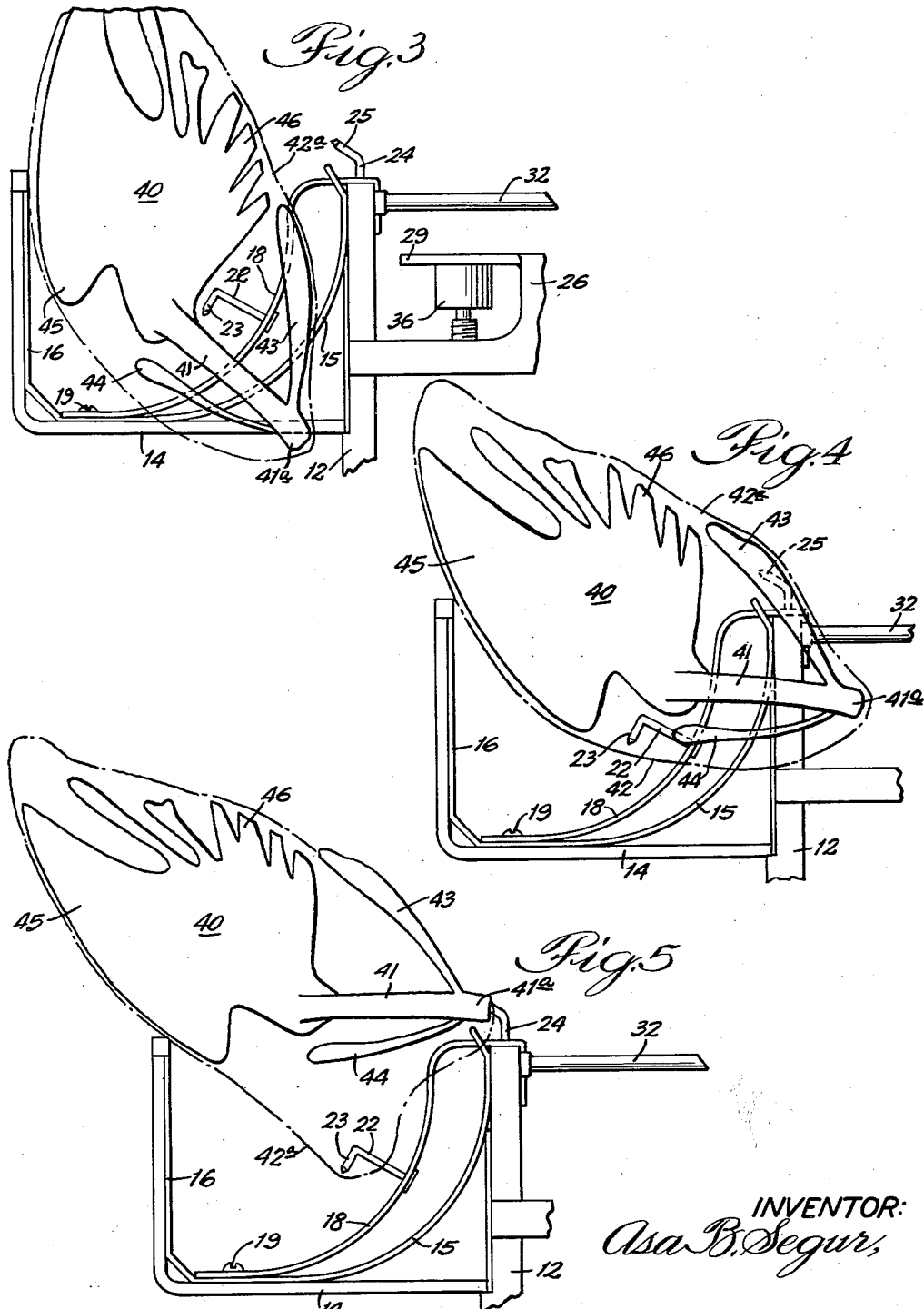

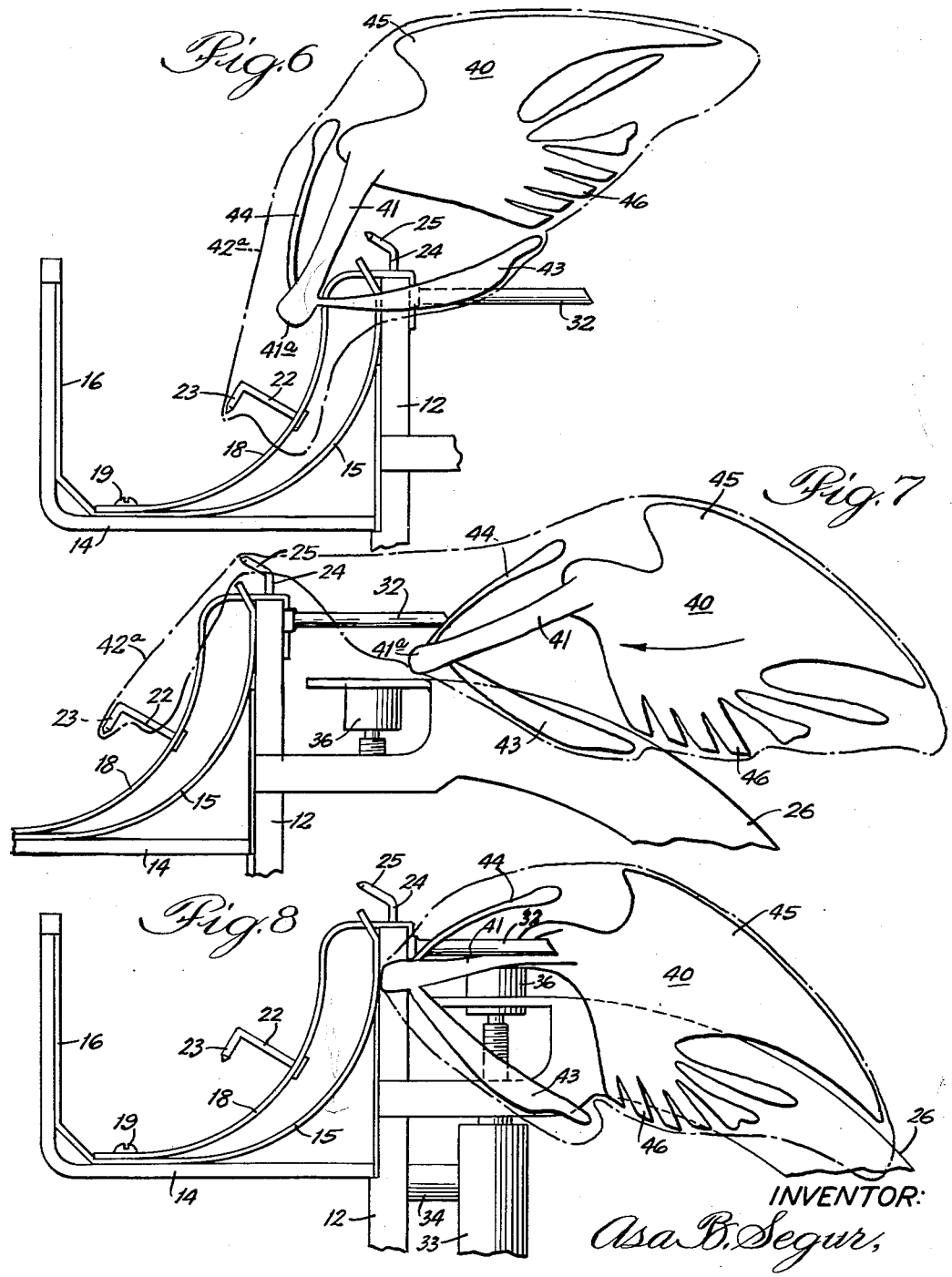

United States Patent Office 3,130,445
Patented Apr. 28, 1964

3,130,445
METHOD FOR REMOVING MEAT FROM POULTRY
Asa B. Segur, 1185 S. Ridgeland Ave., Oak Park, Ill.
Filed Dec. 29, 1960, Ser. No. 79,339
9 Claims. (Cl. 17—45)

This invention relates to the removal of meat from poultry carcasses, and more specifically, to a method for removing meat from body sections, such as the breast sections of poultry carcasses.

In commercial poultry processing plants where meat is removed from cooked or partially cooked poultry for later use in the preparation of soups, meat pies, frozen dinners, etc., the usual procedure is to have a number of operators cut and pull the meat from the poultry carcasses. This is ordinarily a tedious and inefficient operation. Even with experienced operators, there is always the danger that small bones may be accidentally cut or pulled away with the meat and, unless such bones are later detected and removed, they may end up in the final food product purchased by the consumer. Because bone contamination endangers the producer's reputation and may in some instances give rise to legal liability on his part, considerable time is expended in the inspection of meat cuttings prior to the preparation of the final food products.

In the removal of meat from the breast sections of cooked poultry, an operator holds the breast section in one hand and, with a knife in the other hand, cuts and pulls away the meat. Thus, only one of the operator's hands is active in manipulating the knife and in removing the meat. The breast meat of most fowl occurs in two layers: an inner layer and an outer layer. The most objectionable defects or irregularities which are likely to occur in breast meat will generally occur between these two layers. With the usual procedure, especially where a knife is used to cut away the breast meat, it is difficult for an operator to separate the layers and expose whatever defects may be present. Therefore, in a meat processing plant, the meat cut from the breasts of cooked poultry is customarily passed on to an inspection station where inspectors attempt to pull the moist and slippery layers apart and thereby expose the defects for removal. In many instances the layers may remain unseparated, or be improperly separated, with the result that defects such as leaders, granulated bone and discolored meat reach the ultimate consumer.

It is an object of the present invention to provide an improved method and apparatus for removing meat from poultry carcass sections wherein the meat is forced or peeled away rather than cut or sliced, whereby large sections of meat are separated and removed in such a way as to expose any defects therein. Another object is to provide an apparatus for firmly supporting a poultry body section so that an operator may use both hands in removing the meat and may, if desired, remove meat from two such supported sections at the same time.

A further object is to provide easily operated mechanical means for firmly and releasably holding a poultry breast section so that the breast meat is fully exposed for removal by an operator. In this connection, it is a specific object to provide a support equipped with releasable clamping means capable of tightly clamping the bone structure of a breast section for holding that section firmly in inverted position.

Another important object is to provide a method and structure for clamping a section of a poultry carcass, while the skin of the carcass section is still in place, in such a way that the skin and meat may be readily removed without interference by the clamping means. A further object is to provide a method wherein meat is removed from poultry breasts without danger of cutting and mingling bone fragments with the meat as the meat is removed. A still further object is to provide a method wherein the layers of breast meat are cleanly separated from each other at the time of meat removal, thereby exposing any defects or irregularities in the meat. Another object is to provide means for breaking away the coracoid bones, along with the scapulae, after a breast section has been clamped in place.

Other objects will appear from the specification and drawings in which:

FIGURE 1 is a top plan view of a fixture embodying the present invention;

FIGURE 2 is a side elevational view of the fixture;

FIGURE 3 is a broken side elevational view of the fixture showing the location of a poultry breast section at the commencement of a meat removal operation;

FIGURE 4 is a broken side elevational view similar to FIGURE 3 but showing the breast section after it has been partly rotated in one direction;

FIGURE 5 is a broken side elevational view of the fixture showing the breast section after it has been fully rotated in one direction;

FIGURE 6 is a broken side elevational view of the fixture showing a poultry breast after the skin has been hooked upon the fixture and the breast is being rotated in a second direction;

FIGURE 7 is a broken side elevational view of the fixture showing a poultry breast being moved into its final position;

FIGURE 8 is a broken side elevational view of the fixture illustrating a poultry breast in final clamped position thereon;

FIGURE 9 is a fragmentary front elevational view of a fixture modified to include coracoid disjointing means;

FIGURE 10 is a broken side elevational view on a reduced scale of the structure shown in FIGURE 9;

FIGURE 11 is a broken perspective view showing the coracoid disjointing means in operation, such view being of substantially the same scale as FIGURE 10.

In the embodiment of the invention illustrated in the drawings, the numeral 10 generally designates a fixture or device adapted for use in the removing of meat from the breast sections of poultry. The fixture includes a frame consisting of a platform 11 and standards 12 and 13 secured thereto. Platform 11 should be fixed to any suitable support means so that it is disposed approximately 25 to 35 inches above a floor surface. If desired, the platform may be affixed to, or may constitute part of, a table surface.

In front of standard 12 is an L-shaped frame extension 14, the lower leg of the extension being secured at its end to the standard 12 at a point intermediate the upper and lower ends of that standard. A shield 15 has a vertical portion 16 extending along and secured to the rear surface of the extension's vertical leg and a curved portion 17 which curves rearwardly and upwardly from the bottom leg of the extension to the upper end of standard 12. A relatively narrow hook-supporting strip 18 is disposed above shield portion 17 and also curves upwardly from the lower leg of the frame extension 14 to the upper end of standard 12. In the illustration given, the shield and hook-supporting member are connected to the frame extension 14 and standard 12 by screws 19, 20 and 21.

As illustrated most clearly in FIGURE 2, a hook 22 is secured to the curved strip 18 intermediate the upper and lower limits of that strip. Hook 22 projects upwardly and forwardly and, at its forward end, is provided with a downwardly and forwardly facing end portion 23. At the upper end of the standard 12 are a pair of laterally spaced hooks 24 having forwardly and upwardly angled end portions 25. The end portions of hooks 22 and 24 are sharpened for securely gripping the skin of poultry as a breast section is rotated and moved through the space defined by frame extension 14, as will be described in detail hereinafter.

Behind standard 12 is a downwardly and rearwardly curved saddle 26. The saddle is curved both longitudinally and transversely and provides a smooth outer surface which conforms generally to the under surface contour of an inverted poultry breast. At its lower end, the saddle may be connected by screws 27 to standard 13 and at its front end it may be affixed by screws 28 to standard 12. Any other suitable means for securing the saddle in the position illustrated in the drawings may be used.

Saddle 26 is provided with a horizontal front portion 29 disposed behind and below the upper end of standard 12. Portion 29 has a generally rectangular opening 30 extending therethrough. Preferably, the sides of the saddle adjacent front portion 29 are cut away, as indicated at 31, to better accommodate the scapula and coracoid bones of a poultry breast section supported upon the saddle.

Directly above the apertured front portion 29 of the saddle are a pair of horizontal and parallel holding pins or prongs 32. These prongs are spaced above the saddle's front portion and are secured at their front ends to standard 12.

The means for clamping a poultry breast section in position upon saddle 26 comprises a vertically-oriented air cylinder 33 affixed to standard 12 by mounting members 34. The air cylinder has a vertically movable plunger 35 which projects upwardly from the cylinder and which is equipped at its upper end with a clamping member 36. The clamping member is vertically movable through the rectangular opening 30 in saddle portion 29. The clamping member is movable between the lowered or retracted position illustrated by the solid lines in FIGURE 2 and a raised or extended position represented by the broken lines. In its lowered position, the clamping member has its upper surface flush with, or disposed slightly below, the upper surface of front saddle portion 29. The prong elements 32 are spaced apart a distance which is preferably less than the width of clamping member 36.

Air cylinder 33 is entirely conventional in structure and operation and is provided with end fittings 37 for the flow of air into and out of opposite ends of the cylinder through hoses 38. Suitable valves, which may be actuated by either foot or hand controls, direct the flow of air into and out of the cylinder for moving piston 35 and clamping member 36 upwardly and downwardly. Since air cylinders and their actuating means are well known in the art, further description of such structures and their operation is believed unnecessary herein.

The structure illustrated in FIGURES 9 through 11 is identical to the structure already described except that additional means are provided by the fixture for disconnecting the coracoid bones of a carcass mounted upon the saddle. The coracoid detaching means comprises a pair of levers 50 pivotally mounted upon opposite sides of standard 12 for movement in a vertical plane between upstanding raised positions and lowered laterally-projecting positions. Each lever is generally L.-shaped and has a hook-like protuberance 51 at the end of its coracoid engaging leg. The other leg of each lever is pivotally connected to a link 52 and the links at opposite sides of the standard are pivotally connected at their lower ends to vertically movable yoke 53. As the actuator bar 54 connected to the yoke is urged downwardly, as by depressing a suitable foot pedal connected thereto, the free end portions of the levers pivot laterally and downwardly to break the coracoids away from the sternum, as will be described shortly.

The fixture illustrated in the drawings is particularly adapted for use in the removal of meat from the breast sections of poultry. In most cases the poultry will be cooked or partially cooked, although pre-cooking is not necessary and may, in some cases, be undesirable. Immediately following the cleaning and, if desired, the cooking operations, the fowls are sectioned. While various sectioning methods might be used, I prefer to utilize the poultry break apart method and apparatus disclosed in my copending application, Serial No. 27,093, filed May 5, 1960, wherein poultry carcasses are firmly clamped in place and operators then break the poultry apart and place wing, leg, back and breast sections into separate receptacles.

In the operation of the present method, an operator grips in one hand a breast section 40 so that the coracoid bones 41 face downwardly. Preferably, the operator is situated behind the fixture, facing prongs 32, and the breast section is held so that its exterior surface faces forwardly. The carcass section is then urged downwardly so that the two diverging coracoid bones straddle the narrow hook-supporting member 18 below and in front of hook 22 (FIGURE 3). As the breast section is moved closer to the operator, hook 22 catches the flap of skin 42 between the coracoid bones at the front section (FIGURES 4 and 5). When the carcass section 40 has been rotated sufficiently to bring the ends 41a of the coracoids into a position above standard 12, the carcass is pulled rearwardly over the standard into a position above saddle 26 and behind prongs 32. During this rearward movement of the breast section, skin 42, caught by hooks 22 and 24, is pulled taut above prongs 32. This stretching of the skin, as shown most clearly in FIGURE 7, prevents it from interfering with movement of the carcass section into the final position of FIGURE 8. Specifically, the limp flap of skin at the front of the carcass section, consisting at least partially of skin pulled from the neck of the carcass during the preceding dismembering and eviscerating operation, is stretched above the prongs 32 so that as the carcass section is lowered upon saddle 26, and is then urged forwardly such skin will not be caught by the prongs. It has also been found that the preliminary stretching of the skin in this manner tends to loosen its connection with the meat and thereby facilitates the complete removal of the skin after the carcass has been anchored upon the saddle.

When the breast section is in the position illustrated in FIGURE 7, it is still held in the operator's hand and is disposed in inverted position with its concave surface facing downwardly. The scapula 43 straddles the saddle 26 and the forwardly diverging coracoid bones 41 have their ends spaced below and on each side of the paired prong elements 32. The clavicle 44 (wishbone), with its ends connected to the coracoid bones 41, has its lower portions disposed laterally with respect to the ends of the prongs. As the carcass section is urged downwardly and then shoved forwardly, the sharp ends of the tapered prongs pierce the breast meat between the legs of the wishbone and pass rearwardly over the diverging coracoids until the joined end of the wishbone is disposed above and between the ends of the prongs. The operator then actuates the air cylinder to drive clamping member 36 into its raised position and, as that member moves upwardly, it strikes bottom front end of the breast bone or sternum and pins it tightly against the under surfaces of the prongs 32 (FIGURE 8). The breast is thereby clamped firmly in supine position upon saddle 26.

While the operation has thus far been described as a series of distinct steps, in actual practice it is a smooth and uninterrupted operation from the time that the breast section is first gripped by the operator until it is finally clamped in place upon the saddle. When the breast section of the carcass is in clamped position, sternum 45 and sternal ribs 46 extend over the curved upper surface of the saddle with the convex outer surface of the breast facing upwardly towards the operator.

Preferably, a pair of identical fixtures 10 are arranged in side-by-side relation so that a single operator may perform the above steps on two carcass sections at the same time. The succession of steps illustrated in FIGURES 3 through 8 may be carried out with a carcass section gripped only in one hand, and therefore a pair of fixtures permits the hooking of the skins and the clamping of two carcass breast sections at the same time.

As each breast is urged forwardly and is clamped firmly in position, the operator, with the same forward movement of his hands, loosens the skin clinging to the breast and peels it forward to hooks 22 and 24. Then, with both thumbs placed on top of the sternum and the first finger of each hand above the wishbone 44, the operator squeezes his fingers together to pull the upper layer of meat rearwardly and outwardly away from the coracoid and clavicle bones and from the large ribs of the breast. The removed meat sections held in each hand, or placed upon an adjacent table surface, have their undersides facing upwardly and may be readily inspected for defects such as leaders or discolored meat which sometimes appear between the inner and outer layers of the breast meat. Thereafter, the operator lifts the detached skin off of the hooks and drops it into a suitable receptacle. Finally, a similar meat removal operation is performed to remove the second layer of breast meat extending along the sternum and beneath the wishbone of the inverted carcass.

An important aspect of the present invention lies in the fact that the meat is pulled or slid away from the carcass rather than being cut from the bones. As a result, the meat is removed in layers. Large pieces of meat are thereby removed while, at the same time, any defects between successive layers may be readily observed.

Following the removal of the breast meat, the operator may grip clavicle 44 and lift it away from the coracoid bones. Small pieces of meat may then be cleaned from the detached clavicle by a suitable wishbone cleaning device. Thereafter, the operator actuates the coracoid detaching means and the hook-providing legs of levers 50 swing outwardly and downwardly (FIGURE 11) to engage the free ends of the coracoids 41 and, by forcing them laterally and downwardly, cause the coracoids to break away at their points of connection to the sternum 45. This detachment operation is facilitated by the spreading of the scapulae 43 which necessarily occurs as the free ends of the scapulae are forced downwardly over the increasing width of the saddle.

After the coracoids have been broken loose from the sternum, levers 50 are returned by spring means or by any other suitable means to their raised positions and the coracoids, with the attached scapulae, are removed from the clamped carcass section. The air cylinder is then actuated to shift clamping member 36 into lowered position and the breast section or sections (if the fixtures are arranged in a pair) are removed. Thereafter, the operation described above is repeated to remove breast meat from other carcass sections.

While in the foregoing I have disclosed an embodiment of the present invention in considerable detail for purposes of illustration it will be understood by those skilled in the art that many of these details may be varied without departing from the spirit and scope of the invention.

I claim:

1. In a method of removing the meat from poultry carcass sections, the steps of pulling the skin away from a carcass section, positioning the section upon a supporting member while simultaneously inserting a clamping element into said carcass and into contact with a skeletal component thereof, clamping said skeletal component between said element and a second clamping element to hold said section securely in place upon said member with the meat thereof fully exposed, and thereafter removing the meat from said section while the same is in clamped position.

2. In a method for removing the meat from a poultry breast section, the steps of urging an inverted poultry breast section on to a supporting saddle while simultaneously imbedding at least one fixed prong into the breast above the breast bone thereof, clamping said bone securely against said prong to hold said breast firmly upon said saddle, and thereafter removing the meat from the breast section while the same is clamped in position.

3. In a poultry breast meat removal method, the steps of inverting a poultry breast section to that the outer surface thereof faces upwardly, securing the inverted breast upon a rigid support by securely clamping a skeletal component thereof, and thereafter removing the meat from said breast while the same is mounted upon said support.

4. The method of claim 2 in which said meat is removed by pulling and sliding the same from the breast section while the same is mounted upon said support.

5. In a method of removing the meat from poultry carcass sections, the steps of urging a poultry carcass section on to a supporting saddle and against the pointed end of a generally horizontal prong spaced above said saddle to anchor the section in position thereon, and thereafter removing the meat from said section while the same is in anchored position.

6. In a poultry meat removing method, the steps of rotating a carcass section over at least one stationary and forwardly facing hook to catch the skin of said section thereon as the same is moved rearwardly, continuing the rearward movement of said section to pull the hooked skin taut above a supporting saddle and a generally horizontal prong, and thereafter while said skin is in a taut condition urging said section forwardly on to said saddle and against the pointed end of said horizontal prong to anchor said section in position without catching said skin upon said prong, and finally removing meat from said section while the same in anchored upon said saddle.

7. In a method for removing meat and skin from poultry breast sections, the steps of moving a poultry breast section over at least one hook element to catch a portion of skin extending over and between the coracoid bones thereof, rotating said section into an inverted position while at the same time drawing it away from said hook element to pull the skin into taut condition, then anchoring said section in inverted position upon a supporting saddle, and then removing meat from said section while the same is anchored in inverted position.

8. In a poultry meat removal and disjointing method, the steps of clamping a skeletal component of an inverted poultry breast section to hold said section in place upon a rigid support, manually removing meat from said section while the same is secured in place, and thereafter disconnecting the coracoid bones from the sternum thereof by simultaneously urging the free ends of said coracoid bones outwardly and downwardly while said section remains in clamped position.

9. In a poultry meat removal and disjointing method, the steps of positioning an inverted poultry breast section upon a supporting saddle, clamping the anterior sternal portion of said section in place to hold said section firmly upon the saddle, removing meat from said section while the same is in clamped position, and thereafter spreading the free ends of the coracoid bones to break the same away from the clamped anterior sternal portion of said carcass section.

References Cited in the file of this patent
UNITED STATES PATENTS

| | | |
|---|---|---|
| 2,633,601 | Snyder | Apr. 7, 1953 |
| 2,785,437 | Standley et al. | Feb. 19, 1957 |
| 2,793,392 | Cutrera | May 28, 1957 |
| 2,844,844 | Sieczkiewicz | July 29, 1958 |
| 2,897,536 | Bergstrom et al. | Aug. 4, 1959 |
| 2,978,739 | Goldberg | Apr. 11, 1961 |

UNITED STATES PATENT OFFICE
CERTIFICATE OF CORRECTION

April 28, 1964

Patent No. 3,130,445

Asa B. Segur

It is hereby certified that error appears in the above numbered patent requiring correction and that the said Letters Patent should read as corrected below.

Column 6, line 29, for "to" read -- so --.

Signed and sealed this 22nd day of September 1964.

(SEAL)
Attest:

ERNEST W. SWIDER
Attesting Officer

EDWARD J. BRENNER
Commissioner of Patents